United States Patent [19]

Williamson

[11] Patent Number: 4,492,078
[45] Date of Patent: Jan. 8, 1985

[54] GAS TURBINE ENGINE CASING

[75] Inventor: Willie Williamson, Derby, England

[73] Assignee: Rolls-Royce Limited, London, England

[21] Appl. No.: 540,186

[22] Filed: Oct. 7, 1983

[30] Foreign Application Priority Data

Nov. 9, 1982 [GB] United Kingdom ............... 8231922

[51] Int. Cl.³ .................................................. F02C 7/20
[52] U.S. Cl. ................................. 60/39.31; 415/219 R
[58] Field of Search ................. 60/39.31, 39.32, 39.08; 415/212 A, 213 C, 219 R

[56] References Cited

U.S. PATENT DOCUMENTS 2,466,827 4/1949 Roth ................................. 415/219 R
2,524,390 10/1950 Laubach et al. ................ 415/219 R
4,022,018 5/1977 Toten et al. ......................... 60/39.31

FOREIGN PATENT DOCUMENTS 1506952 4/1978 United Kingdom ............... 60/39.31

Primary Examiner—Louis J. Casaregola
Attorney, Agent, or Firm—Cushman, Darby & Cushman

[57] ABSTRACT

Polygonal turbine casings which have inherent resistance to deformation by virtue of their many flat sides taking thermal loads etc. in compression or tension, are improved upon by the present invention by way of assembling the casing so as to pre-tension its flats to such an extent that any compressive loads which are felt, never reach a value which would entirely negate the tensile load.

5 Claims, 4 Drawing Figures

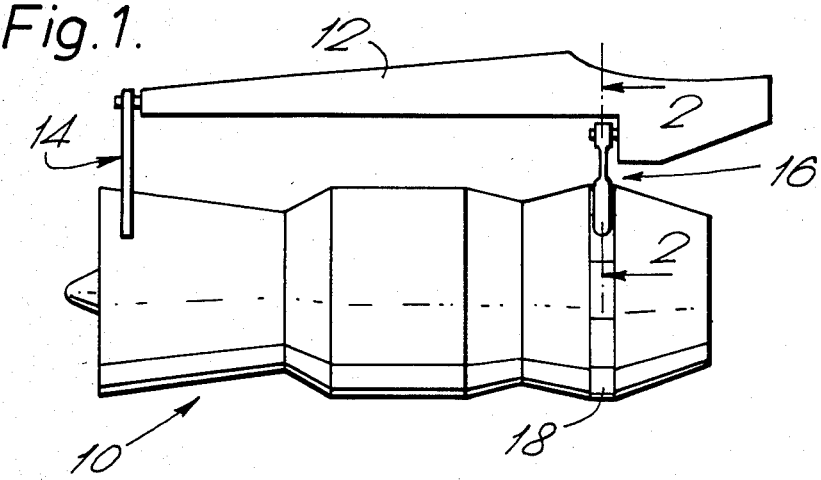
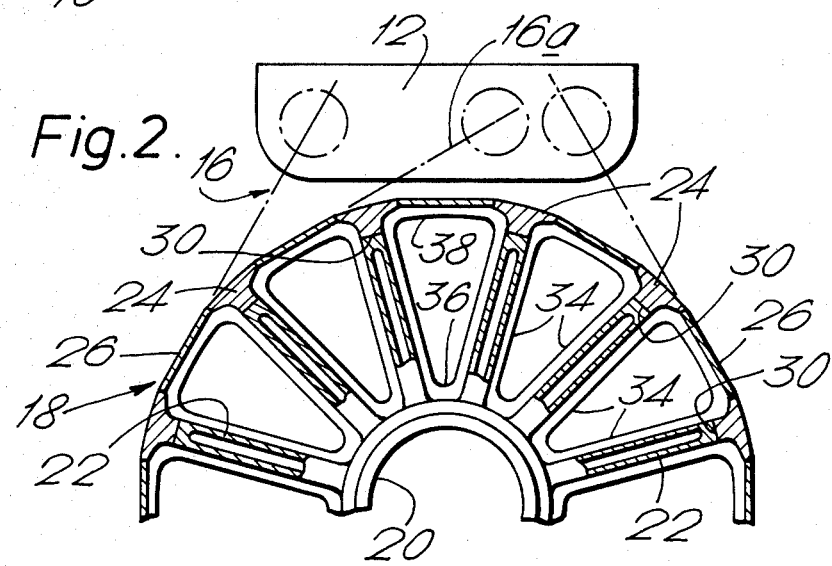
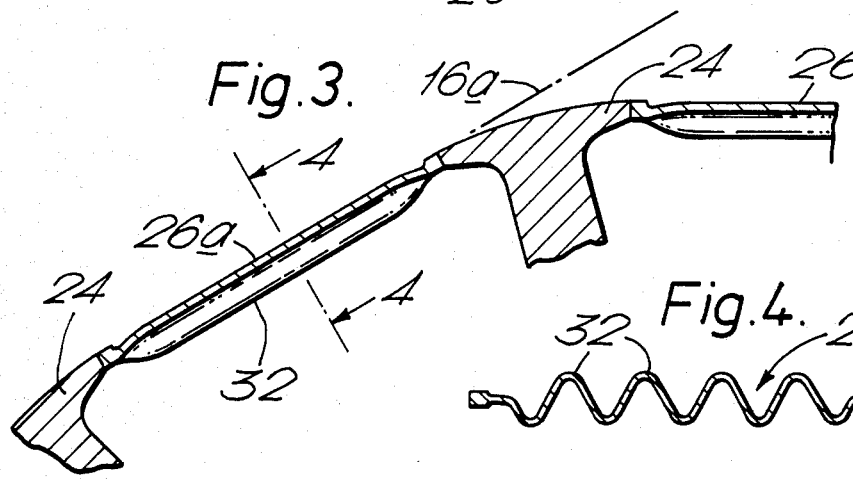
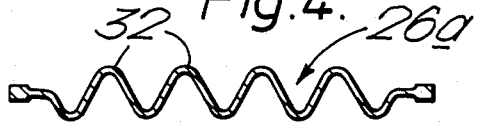

GAS TURBINE ENGINE CASING

This invention relates to casings for gas turbine engines of the kind normally used for the propulsion of aircraft.

More particularly, the invention relates to casings which are polygonal in shape.

British patent specification No. 1,506,952 and the publication ASME Vol 103 October, 1981 both disclose polygonal casings and demonstrate that such shapes are better able to cater for out of balance loads and thermally generated loads, in as much as the straight portions of the polygon are placed only in tension or compression when such loads are applied and consequently do not deform. Such a resistance to deformation gives the polygonal casing a distinct advantage over truly circular casings, particularly where the casing is positioned so as to surround a rotating structure, such as a turbine stage. The lack of deformation ensures inter alia greatly reduced if not entirely obviated, turbine blade tip rub.

It should be noted that both of the publications mentioned hereinbefore, refer to both tensile and compressive loads being experienced by a polygonal structure.

The present invention seeks to provide an improved polygonal casing structure.

According to the present invention a polygonal casing suitable for use on a gas turbine engine comprises a hub a plurality of spokes radiating outwards from said hub in equi-angularly spaced relationship, each spoke terminating in a flanged cap each pair of adjacent flanged caps being joined via their flanges by a plate which is straight at least in a direction peripherely of the casing, and wherein said flanged caps and plates comprise a sub-assembly which is shrunk onto said spoke ends so as to exert a tensile stress of such magnitude on said plates, that under predictable operating conditions of a gas turbine engine including said casing, tensile stress in said plates would not be obviated.

Preferably the casing includes on its outer periphery means for suspending said casing from aircraft structure.

The boss may comprise a bearing housing.

Preferably each spoke is surround by a sheet metal vane and adjacent vanes may be joined via their roots and tips by annular walls so as to define a fluid flow annulus therebetween. At least one of said plates may be corrugated, the pitch of the corrugations being in a direction parallel with the longitudinal axis of the casing.

The invention will now be described by way of example and with reference to the accompanying drawings in which:

FIG. 1 is a diagrammatic view of a gas turbine engine incorporating an embodiment of the invention;

FIG. 2 is cross sectional part view of line 2—2 of FIG. 1;

FIG. 3 is an enlarged part view of an alternative embodiment of the invention, and FIG. 4 is a view on line 4—4 of FIG. 3.

Referring to FIG. 1. A gas turbine engine 10 is suspended from an aircraft wing pylon 12 by means 14 shown diagrammatically at the upstream end of engine 10 and by a linkage 16 near the downstream end thereof.

Linkage 16 is pivotally connected to a polygonal casing 18 which is more clearly seen in FIG. 2.

Referring now to FIG. 2. Polygonal casing 18 is constructed from a central hub 20 which in the present example serves as a housing for a turbine shaft bearing (not shown), a number of equi-angularly spaced spokes 22 which radiate outwardly from housing 20, end caps 24 each of which is fixed to the end of a respective spoke 22, by welding, set screws or other suitable means, and a number of straight plates 26, which are fixed via their ends, preferably by electron beam welding, to the edges of flanged portions of caps 24, thus defining a spoked boss surrounded by a casing of polygonal profile.

End caps 24 and plates 26 are joined prior to fitting the caps 24 onto the ends of spokes 22. The radially inner ends 30 of caps 24 are then machined to lie in a circle the diameter of which is less than the diameter of the circle on which the ends of spokes 22 lie. The sub assembly of caps 24 and plates 26 is heated until it has expanded sufficiently for the end caps 24 to be slid onto their respective spoke ends.

On cooling of the sub assembly, it shrinks and so presses on the ends of spokes 22, with the result that it becomes immovable.

It will be appreciated that when the sub assembly of caps 24 and plates 26 expands through heating, the lengths of the plates 26 will increase. On cooling, spokes 22 will prevent the sub assembly from returning to its original size with the result that plates 26 will be subjected to a permanent tensile stress. The magnitude of the required tensile stress can be calculated by known methods and induced in the polygonal casing by assembling it in the manner described hereinbefor. Similarly the compressive loads likely to be experienced by casing 18 during operation of the gas turbine engine 10 can also be calculated by known methods. The precise interference fit of caps 24 to spokes 22 can thus be assessed, which would be required so as to ensure that at least any predictable compressive loads which could be experienced by the casing will never be of such magnitude as to entirely obviate the tensile stress in the plates.

One important aspect of aero engine design, is in the minimising of weight of components whilst maintaining a sufficiency of strength and rigidity. It follows that although calculations may show that a certain minimum thickness of straight plate 26 should be used to achieve the required strength in operation, weight requirements may demand a reduction in that thickness.

Referring now to FIG. 3. The polygonal casing 18 should be assumed to have a thickness dictated by weight and includes a plate 26a which is corrugated, the currugations 32 being arranged to run periphirally of casing 18.

In the present example, corrugated plate 26a is positioned so as to be aligned with and connected by one end to torque link 16a, the specific task of which is to counter any tendency of engine 10 to rotate bodily against its axis in a clockwise direction. Should this occur, despite plate 26a being thinner than is really desirable, it will resist the compressive load it experiences by virtue of the stiffening effect of corrugations 32.

In FIG. 4, the corrugations 32 are shown more clearly.

Referring back to FIG. 2. It will be appreciated that a polygonal casing does not have a profile which is suitable for providing a gas flow duct. To cater for this spokes 22 are surrounded by thin sheet metal aerofoils 34 joined at their inner and outer ends by thin sheet metal annular wall portions 36, 38. Though not shown, other annular inner casings can be joined via flanges to the upstream and downstream ends of sheet metal wall portions 36, 38, so as to provide the desired flow path.

I claim:

1. A polygonal casing suitable for use as a gas turbine engine bearing housing and comprising a hollow hub, a plurality of spokes radiating outwardly from said hub in equiangularly spaced relationship, each spoke terminating in a flanged cap, each pair of adjacent flangeed caps being joined via their flanges by a plate which is straight at least in a direction peripherally of the casing and wherein said flanged caps and plates comprise a sub assembly which is shrunk onto the spoke ends so as to exert a tensile stress of such magnitude on said plates that under predictable operating conditions of a gas turbine engine which includes said casing, tensile stress in said plates is not obviated.

2. A polygonal casing as claimed in claim 1 comprising links for suspending said casing from aircraft fixed structure.

3. A polygonal casing as claimed in claim 1 wherein said hub comprises a bearing housing.

4. A polygonal casing as claimed in claim 1 wherein at least one said plate is corrugated, the length of the corrugations lying in a direction peripherally of said casing.

5. A polygonal casing as claimed in claim 1 wherein each spoke is surrounded by a sheet metal aerofoil vane and adjacent vanes are joined via their radially inner and outer ends by annular wall portions so as to define a fluid flow annulus therebetween.

* * * * *